(12) United States Patent
Kelly et al.

(10) Patent No.: US 9,070,126 B2
(45) Date of Patent: Jun. 30, 2015

(54) ENTITLEMENT VALIDATION SYSTEM FOR GAMES

(71) Applicant: Laserforce International Pty Ltd., Woolloongabba, QLD (AU)

(72) Inventors: Leonard Kelly, Woolloongabba (AU); Christopher Carton, Woolloongabba (AU)

(73) Assignee: LASERFORCE INTERNATIONAL PTY LTD., Queensland (AU)

( * ) Notice: Subject to any disclaimer, the term of this patent is extended or adjusted under 35 U.S.C. 154(b) by 32 days.

(21) Appl. No.: 13/875,712

(22) Filed: May 2, 2013

(65) Prior Publication Data

US 2013/0296040 A1 Nov. 7, 2013

(30) Foreign Application Priority Data

May 2, 2012 (AU) .................................. 2012901791

(51) Int. Cl.
| | |
|---|---|
| G06F 17/00 | (2006.01) |
| G06Q 20/04 | (2012.01) |
| A63F 13/73 | (2014.01) |
| A63F 13/30 | (2014.01) |
| A63F 13/837 | (2014.01) |
| A63F 13/792 | (2014.01) |
| G06Q 10/02 | (2012.01) |
| A63F 13/00 | (2014.01) |

(52) U.S. Cl.
CPC ............... *G06Q 20/045* (2013.01); *A63F 13/00* (2013.01); *A63F 13/73* (2014.09); *A63F 13/30* (2014.09); *A63F 13/837* (2014.09); *A63F 13/792* (2014.09); *G06Q 10/02* (2013.01)

(58) Field of Classification Search
CPC . G07F 17/3218; G07F 17/3239; G07F 17/42; A63F 67/00; A63F 13/00; A63F 9/02; G06Q 10/02
USPC ............................................ 463/7, 40–42, 29
See application file for complete search history.

(56) References Cited

U.S. PATENT DOCUMENTS 5,738,591 A * 4/1998 Opsal ................................ 473/4
2001/0044337 A1 11/2001 Rowe et al.

(Continued)

OTHER PUBLICATIONS

Blazer Tag, "Laser Tag", Jan. 20, 2011, https://web.archive.org/web/20110120220021/http://blazertag.com/lasertag.php.*

(Continued)

*Primary Examiner* — Justin Myhr
(74) *Attorney, Agent, or Firm* — Young & Thompson

(57) ABSTRACT

An entitlement validation system for laser tag games having a laser tag vest arranged to be activatable for enabling game play has a ticketing module arranged to issue a ticket with a machine readable identification code upon payment made for a selected game, and to update a game entitlement database having identification codes matched with corresponding selected games, a ticket reader arranged to read the identification code of a ticket presented for game activation, a game controller arranged to receive the identification code transferred from the ticket reader and to activate the game equipment upon verifying of entitlement by matching the received identification code with the corresponding selected game in the database. The system may have a base station arranged as a communications link between the ticket reader and the game controller. The ticket reader may be integrated into the game equipment or installed in a validation activation station.

5 Claims, 2 Drawing Sheets

(56) References Cited

U.S. PATENT DOCUMENTS

2006/0144929 A1\* 7/2006 McGee et al. ................. 235/382
2006/0180647 A1\* 8/2006 Hansen ......................... 235/375
2012/0040751 A1\* 2/2012 Peters ............................ 463/29

OTHER PUBLICATIONS

International Search Report 2012901791 dated Dec. 12, 2012.
Site Management—Laserforce Tag International; retrieved on Dec. 12, 2012, URL: http://www.laserforcetag.com/site-management.

\* cited by examiner

ENTITLEMENT VALIDATION SYSTEM FOR GAMES

FIELD OF THE INVENTION

THIS INVENTION relates to an entitlement validation system for games, and in particular but not limited thereto, the system is for a laser tag game.

BACKGROUND OF THE INVENTION

A large number of games such as laser tag games are played with a game equipment such as a laser tag vest, which must be activated by a responsible personnel of a business. The personnel will need to check that the customer has paid for the game before activating the game equipment. In all current laser tag game systems known to the applicant, the processes of customer payment and activation of game equipment are completely separate.

The game equipment will work, even if the customer has not paid. Fraud prevention (if any) can only be done after the fact by reconciling the number of games played against the number of games paid for.

To minimise game leakage due to people playing without payment or continuing to play after completion of paid for games, resources including additional personnel must be extended to do the reconciliation processes for the equipment being used by customers. The reconciliation processes therefore add substantial costs to businesses.

OBJECTS OF THE INVENTION

An object of the present invention is to provide an entitlement validation system for games, which alleviates or reduces to a certain level one or more of the above mentioned prior art problems.

SUMMARY OF THE INVENTION

In one aspect therefore, the present invention resides in an entitlement validation system for games having a game equipment arranged to be activable for enabling game play. The system comprises a ticketing module arranged to issue a ticket with a machine readable identification code upon payment made for a selected game, and to update a game entitlement database having identification codes matched with corresponding selected games, a ticket reader arranged to read the identification code of a ticket presented for game activation, a game controller arranged to receive the identification code transferred from the ticket reader and to activate the game equipment upon verifying of entitlement by matching the received identification code with the corresponding selected game in the database.

Preferably, said game is a laser tag game and the game equipment is a laser tag vest.

The ticketing module may have selectors for different games and/or services. The ticketing module may also have one or more slots for insertion of coins and/or notes and/or transaction cards such as credit cards and debit cards. The ticketing module is preferably a point-of-sale (POS) terminal.

The identification code on the issued ticket may be in the form of a barcode or carried on a magnetic strip or RFID tag or other mechanism.

The system may have a base station arranged as a communications link between the ticket reader and the game controller. Preferably, the base station is arranged to receive data representing the identification code and selected game from the ticket reader and to transfer the received data to the game controller. The ticket reader may be integrated into the game equipment or installed in a validation activation station such as a booth where the customer stands.

In preference, the game controller upon verifying a match of the data representing the received identification code with the corresponding selected game which has not been marked as consumed in the database is arranged to transfer an activation signal to the game equipment. The activation signal may be transferred directly to the game equipment or via the base station.

The game controller may be arranged to update the database by inserting data representing consumption of the game corresponding to the identification code following transfer of the activation signal.

The game controller may also be arranged to transfer a rejection signal to the game equipment where entitlement of the identification code cannot be verified. Preferably, the game equipment has an indication unit arranged to provide a visual and/or audio indication upon receiving an activation signal and/or the rejection signal.

Desirably, the link between the game equipment and the base station is a wireless link.

BRIEF DESCRIPTION OF THE DRAWINGS

In order that the present invention may be more readily understood and be put into practical effect reference will now be made to the accompanying drawings which illustrate non-limiting preferred embodiments of the invention and wherein.

DETAILED DESCRIPTION OF EMBODIMENTS SHOWN IN THE DRAWINGS

Figure 1:
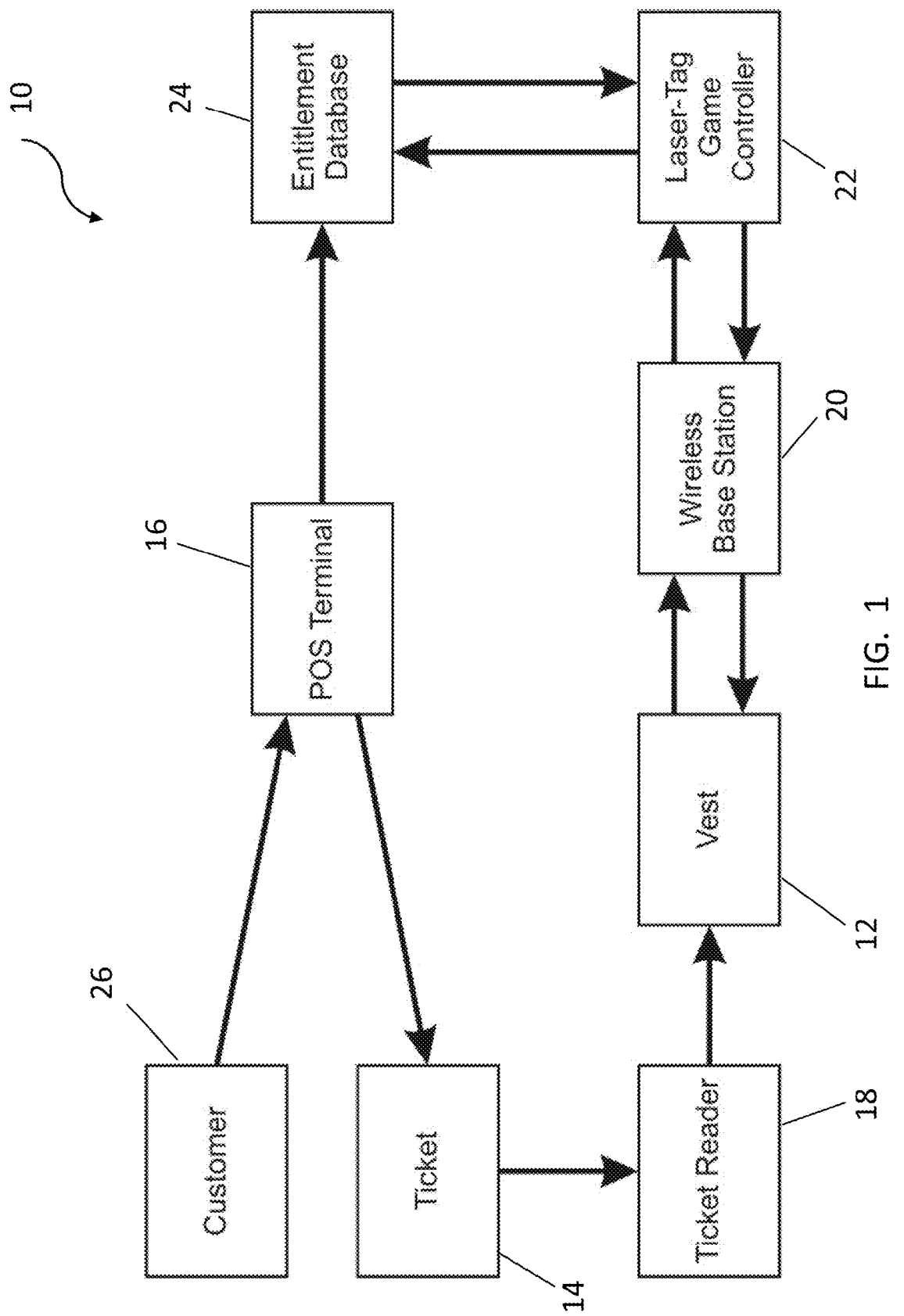
FIG. 1 is a schematic diagram showing an embodiment of the entitlement verification system according to the present invention.

Referring to the drawings, and initially to FIG. 1, there is shown an embodiment of the game entitlement verification system 10 according to the present invention. The system 10 in this embodiment is for a laser tag game having a laser tag vest (game equipment) 12, activation of which is to be controlled depending on verification of entitlement of a machine readable ticket 14.

The ticket 14 is issued by a ticketing module 16 which is a POS terminal in this embodiment. Upon receiving an appropriate payment for a game or service, an operator can press a ticket issue button (not shown) for issuing a machine readable ticket 14 for the selected game/service. The module 16 may be a fully automated POS terminal which has selection buttons for selection of a game or service and payment slots where cash or a transaction card can be inserted for making payment. The selection buttons may be in the form of icons on a monitor.

Figure 2:
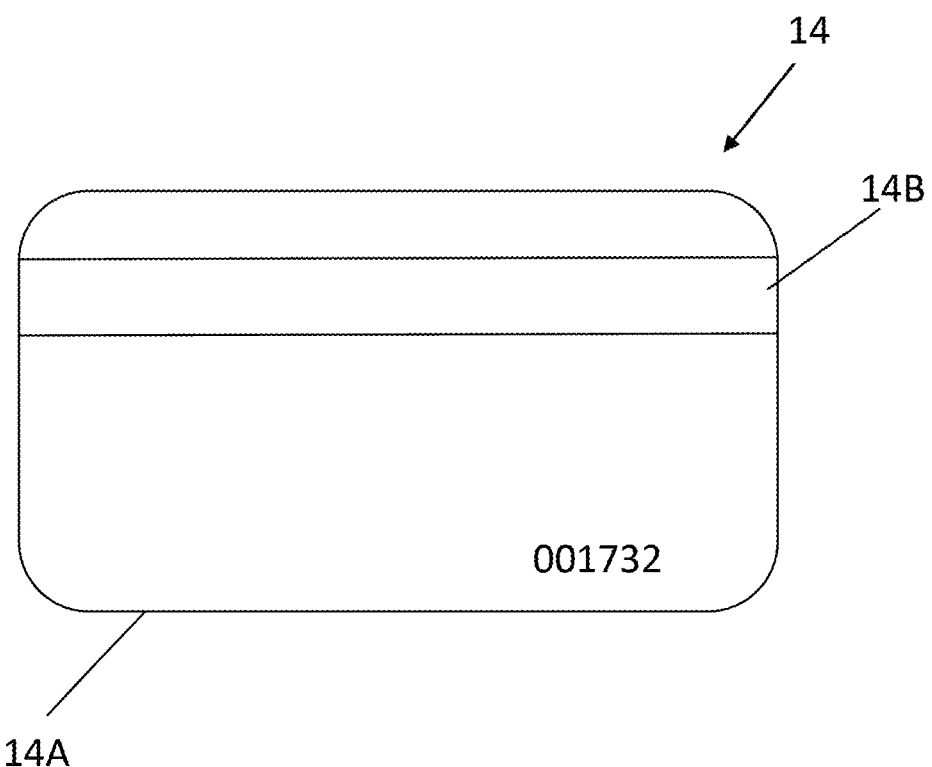
FIG. 2 is a drawing showing an example of the ticket with a magnetic strip.

As shown in FIG. 2, the ticket 14 for this embodiment is in the form of a plastic card with a substantially rectangular shaped plastic body 14A and a magnetic strip 14B where an identification code (not shown) is stored. The ticket can be in any other form having an identification code which can be read by a machine. Examples of such identification codes are a barcode, RFID tag, text/numeral reference and other mechanism.

The ticketing module 16 has a data storage 24 where a database containing identification codes of issued tickets and selected games for the issued tickets are stored. The database also has markings for consumed games. An example of the database is as follows:

| Ticket ID | Game Type | No. of games | Consumed |
|---|---|---|---|
| 00017321 | 2 | 2 | Yes |
| 00017322 | 1 | 2 | |
| 00017323 | 4 | 1 | Yes |
| 00017324 | 1 | 1 | |
| 00017325 | 3 | 2 | Yes |

The identification codes (Ticket ID) are also printed on the issued tickets (see FIG. 2) so that entitlement verification can be manually processed if the machine readable code on the magnetic strip 14B is damaged.

The vests (game equipment) 12 has a ticket reader 18 and is in wireless communication with a game controller 22 via a wireless base-station 20.

To play a game, the laser tag vest 12 (game equipment) must receive an activation signal from the controller 22. The system 10 requires an issued ticket 14 to be verified for determining whether the customer presenting the ticket read by the reader 18 does or does not have entitlement to play. In the determining process, the base station 20 retrieves the data representing the identification code on the read ticket and transfers the data to the controller 22. The controller then searches the database in the storage 24 for a match with any of the ticket IDs in the database. If a match is found and the game for this ID has not been consumed, the controller sends an activation signal for the game type and number of games listed for this ID. The base station 20 transfers the activation signal to the vest 12 which on receiving this signal provides a verbal indication that the selected game is ready to be played. If a match is not found, the controller 22 sends an invalid signal to the vest 12. The vest than provides a verbal message to inform customer that the ticket is not valid.

The laser-tag game controller 22 communicates with the POS terminal 16 by way of an application programming interface (API). This API has two functions:

| Function | Parameters | Result | Description |
|---|---|---|---|
| Consume Entitlement | Game Type, Ticket ID | Success/Failure | If the ticket identified by "Ticket ID" has a valid entitlement to play "Game Type" then consume this entitlement and return "Success" Otherwise return "Failure" |
| Refund Entitlement | Game Type, Ticket ID | None | Refund an entitlement to play "Game Type" back to the ticket identified by "Ticket ID" |

The machine readable ID on the ticket (the "Ticket ID") can be anything as long as it uniquely identifies the ticket. A simple incrementing number sequence like "00017321", "00017322", etc may be suitable in many situations. This number is then encoded in the barcode or magnetic stripe on the card. In the case of RFID cards, these normally come pre-programmed with a unique identifier (the Card ID) and this can be used as the ticket ID.

Figure 3:
FIG. 3 shows examples of the front and back views of tickets in the form of RFID tags.

FIG. 3 shows examples of the RFID tickets that can be issued by the POS terminal 16. The tickets in this case are RFID cards in a credit-card form factor. Each ticket has a unique ID embedded in its RFID tag. The RFID tag and antenna are not visible because they are built into the plastic ticket (0.8 mm thickness) and are not accessible after manufacture (except for reading via RFID). For manual checking and troubleshooting purposes, the unique ID is also printed in the bottom right corner of the ticket. From top left and moving clockwise, the unique IDs shown in Error! Reference source not found. are: "0100105E18", "04015720 061,18024", "440060B085" and "2A004F56F0".

In an alternate embodiment, the "game type" mentioned above is filled in by the laser-tag game controller. An example of the process for this alternate embodiment is as follows:

(a) Initially the game controller has no game type selected. In this mode, any attempt to activate any vest is rejected outright without any communication with the POS system.

(b) An operator will select an active game type on the game controller. For most games, this might be "Lasertag—Standard Length".

(c) Once the game type has been selected, any attempt to activate a vest will then send the ticket ID and game type ("Lasertag—Standard Length") to the POS terminal for validation. If the ticket is valid and has an entitlement for "Lasertag—Standard Length" then the vest will be allowed to activate and take part in the game.

(d) Sometimes, a different game type will be played. This might require an entitlement of (say) "Lasertag—Double length", because the game runs for twice as long as normal. In this case, tickets must have a valid entitlement for this type or they are rejected. Even though a ticket may have an entitlement for "Lasertag—Standard Length", that is not sufficient to play if the game type is "Lasertag—Double length".

(e) The ticket might have other entitlements that are not related to lasertag at all, like entitlements to play a certain number of video games, etc.

Whilst the above has been given by way of illustrative example of the present invention many variations and modifications will be apparent to those skilled in the art without departing from the broad ambit and scope of the invention as herein set forth in the following claims.

The invention claimed is:

1. An entitlement validation system for laser tag games, comprising:

game equipment comprised of laser tag vests, each vest configured to be worn by a respective game participant, each vest arranged to be activable for enabling game play;

a ticketing module arranged to issue a ticket, with a machine readable identification code provided thereon, upon payment being made and a game being selected;

a game entitlement database recorded on a non-transitory computer-readable medium;

a data processor in communication with said game entitlement database and configured to update the game entitlement database, the game entitlement database having stored therein identification codes matched with corresponding selected games;

a ticket reading device configured to read the identification code of the ticket presented for game activation; and a game controller, in communication with the ticket reading device, the game controller configured to receive the identification code transmitted from the ticket reading device and to activate a vest for game play upon verifying entitlement by matching the received identification code with a corresponding selected game in the game entitlement database, wherein, upon the verifying of the entitlement, the data processor updates the game entitlement database to indicate the corresponding selected game as being consumed.

2. The entitlement validation system according to claim 1, further comprising:
a base station arranged as a communications link between the ticket reading device and the game controller, the base station being configured to receive data representing the identification code and selected game from the ticket reading device and to transfer the received data to the game controller.

3. The entitlement validation system according to claim 1, wherein the game controller, upon the verifying of a match of the received identification code with the corresponding selected game, which has not been indicated as consumed in the database, transfers an activation signal to activate a selected vest.

4. The entitlement validation system according to claim 1, wherein the game controller, upon the verifying of a match of the received identification code with the corresponding selected game, which game has not been marked as consumed in the database, transfers an activation signal to activate a selected vest, and
wherein the game controller updates the database by inserting data representing consumption of the game corresponding to the identification code, following transfer of the activation signal.

5. The entitlement validation system according claim 1, wherein the game controller transfers a rejection signal to a selected vest when entitlement of the identification code cannot be verified, and
wherein the vest is provided with an indication unit that indicates receipt of the rejection signal.

\* \* \* \* \*